United States Patent [19]

Bott

[11] E Patent Number: Re. 32,583

[45] Reissued Date of Patent:* Jan. 26, 1988

[54] ARTICLE CARRIER FOR AUTOMOTIVE VEHICLES

[76] Inventor: John A. Bott, 931 Lake Shore Dr., Grosse Pointe Shores, Mich. 48236

[ * ] Notice: The portion of the term of this patent subsequent to Apr. 5, 1994 has been disclaimed.

[21] Appl. No.: 819,053

[22] Filed: Jan. 15, 1986

Related U.S. Patent Documents

Reissue of:

[64] Patent No.: 4,427,141
Issued: Jan. 24, 1984
Appl. No.: 443,024
Filed: Nov. 19, 1982

U.S. Applications:

[60] Continuation of Ser. No. 242,138, Mar. 9, 1981, abandoned, which is a continuation of Ser. No. 56,373, Jul. 10, 1979, abandoned, which is a division of Ser. No. 924,072, Jul. 7, 1978, Pat. No. 4,182,471, which is a division of Ser. No. 743,602, Nov. 22, 1976, Pat. No. 4,099,658, which is a continuation of Ser. No. 486,415, Jul. 8, 1974, abandoned.

[51] Int. Cl.[4] ..... B60R 9/00
[52] U.S. Cl. ..... 224/326; 224/324
[58] Field of Search ..... 224/309, 310, 314–331; 453/292, 308; 211/17; 248/499, 500, 503

[56] References Cited

U.S. PATENT DOCUMENTS

| | | | |
|---|---|---|---|
| 2,639,848 | 5/1953 | Burmeister | 224/325 |
| 3,143,264 | 8/1964 | Spero | 224/325 |
| 3,273,768 | 9/1966 | Duer | 224/323 |
| 3,542,264 | 11/1970 | Meyer et al. | 224/326 |
| 4,015,760 | 4/1977 | Bott | 224/324 |
| 4,055,284 | 10/1977 | Bott | 224/326 |
| 4,156,497 | 5/1979 | Bott | 224/326 |
| 4,182,471 | 1/1980 | Bott | 224/326 |
| 4,343,419 | 8/1982 | Mareydt | 224/326 |

FOREIGN PATENT DOCUMENTS

| | | | |
|---|---|---|---|
| 1023398 | 3/1953 | France | 224/325 |

*Primary Examiner*—Henry J. Recla
*Assistant Examiner*—Linda J. Sholl
*Attorney, Agent, or Firm*—Harness, Dickey & Pierce

[57] ABSTRACT

An article carrier is mounted on an exterior automobile body surface. The carrier utilizes special decorative slats for supporting the weight of luggage or the like and also as a means for mounting cross bars, ski racks or tie-down members and similar article securing devices on the automobile body. The devices mounted on the slats are easily removed, interchanged or adjusted in position on the slats in accordance with the needs of the user.

31 Claims, 18 Drawing Figures

FIG. 12.
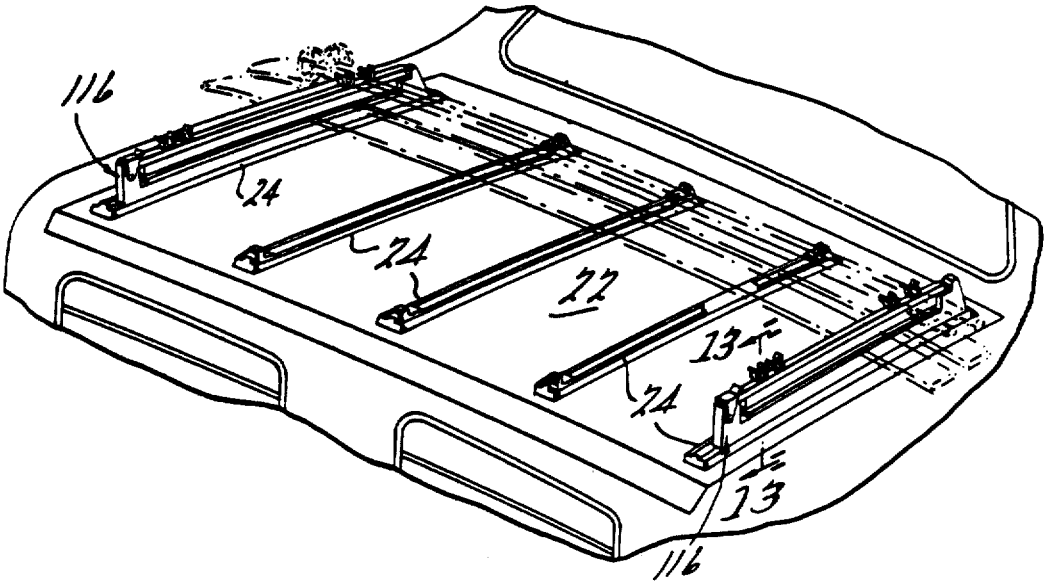
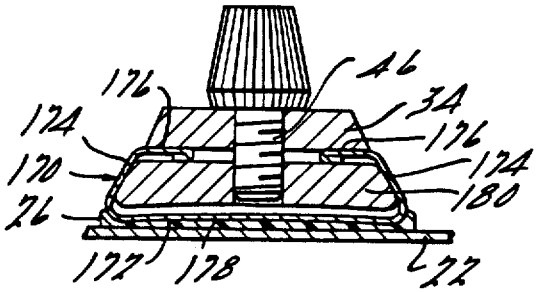
FIG. 18.
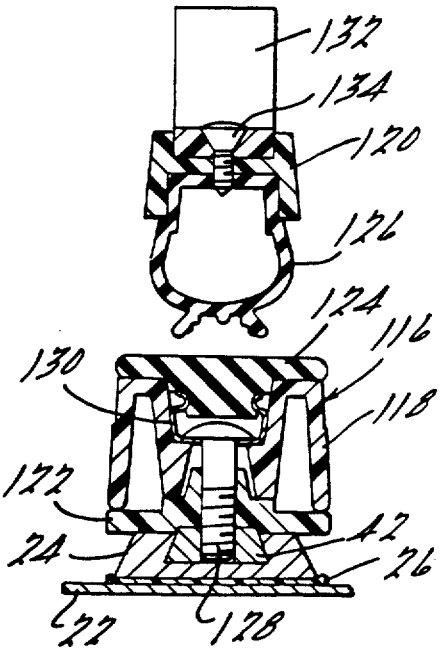
FIG. 13.

ARTICLE CARRIER FOR AUTOMOTIVE VEHICLES

Matter enclosed in heavy brackets [ ] appears in the original patent but forms no part of this reissue specification; matter printed in italics indicates the additions made by reissue.

This is a continuation of application Ser. No. 242,138, filed Mar. 9, 1981 now abandoned, which is a continuation of Ser. No. 56,373, filed July 10, 1979 now abandoned; which is a Div. of Ser. No. 924,072, filed July 7, 1978 now U.S. Pat. No. 4,182,471, issued Jan. 8, 1980; which is a Div. of Ser. No. 743,602, filed Nov. 22, 1976 now U.S. Pat. No. 4,099,658, issued July 11, 1978; which is a continuation of Ser. No. 486,415, filed July 8, 1974, now abandoned.

BACKGROUND OF THE INVENTION

Automobile luggage racks frequently employ two separate subassemblies or portions: a rectangular framework which surrounds the load to be carried and a plurality of slats which rest on the roof or other automobile body surface and carry the weight of the load. In such constructions the framework and the slats are often secured to the automobile body independently of one another or the slats are connected to the body through the framework by means of special cross straps. In still another automobile luggage or article carrier, the means of confining the luggage and supporting its weight are formed into one unitary welded tubular assembly.

Some luggage racks or article carriers have been designed to be secured on an automobile body by flexible straps or the like and are relatively easily removable from the automobile. Such carriers, however, have not enjoyed great popularity. They have generally been quite unsightly and their bulk and weight have made their removal and storage rather difficult. Accordingly, most automobile owners desiring a luggage rack have favored the type of luggage rack which is permanently mounted on the vehicle. The one type of article carrier of the removable type which is in common use is a so-called "ski rack". Ski racks have traditionally been somewhat awkward to install on and remove from an automobile. Also, the presence of a luggage rack on an automobile has frequently interferred with the use of a ski rack.

In my prior U.S. Pat. No. Re. 26,539, I disclosed a luggage carrier having cross bars which can be adjusted to accommodate loads of varying size. This construction has achieved significant commercial success. Nevertheless, some problems have been experienced in adapting this type of luggage carrier to the carrying of certain types of loads, including skis. While this type of carrier does provide an improved degree of flexibility in its use, it is believed that a need exists for a luggage rack which has the attractive appearance of modern permanently mounted luggage carriers but which possess a degree of removability and greater adaptability to varying loads.

SUMMARY OF THE INVENTION

The present invention is distinguished by its use of specially constructed load supporting slats which also provide the means of attachment of the article securing member to the automobile body. Such article securing member may consist of a rectangular framework, raised cross bars, ski racks, tie-down members or any other desired article securing device. The slats are decorative in appearance and perform the usual slat functions of reinforcing the roof, trunk lid or other body surface on which they are mounted and holding luggage or other objects to be carried out of contact with the painted finish of the automobile. However, they serve the added function of providing an attachment location for one or more article securing members. The slats maintain a low profile on the automobile surface and are designed to be left on the automobile by themselves without any remaining portion of the carrier, if desired. Special end caps may be used to cover up the ends of the slats. These end caps may incorporate eyelets by which straps or ropes can be attached to the automobile for tying down luggage.

In one form of the invention the slats are formed with upwardly facing channels in which a nut is slidable. The means of attachment of the article securing member to the slat includes a screw which is threaded into the nut so as to draw the nut against a clamping surface of the slat. The slat is of greater width than height, providing a broad article supporting surface. These surfaces may be used cooperatively with the clamping surfaces of the slats for locking an article securing member in place.

Among the objects of the present invention are the provision of an article carrier for an automobile in which all portions of the article carrier which project to any appreciable degree above the body surface on which it is mounted may be conveniently removed, adjusted in position, interchanged and/or reinstalled. It is another object of the present invention to provide an article carrier of the foregoing type which is adapted for use with a wide variety of article securing members such as a ski rack, a cross bar, an article confining framework, tie-down eyelets and the like. It is still another object of the present invention to provide an article carrier of the foregoing type which helps to protect the finish of the automobile body, is attractive in appearance, structurally reinforces the surface of the automobile body to which it is secured, may be manufactured at a reasonable cost and is highly convenient to use and is readily adapted to carrying a wide variety of loads.

BRIEF DESCRIPTION OF THE VIEWS OF THE DRAWING

FIG. 12 is a view similar to FIG. 1 but with the cross bar removed and a pair of ski carriers installed on the slats;

FIG. 13 is an enlarged sectional view of the structure illustrated in FIG. 12 taken along the line 13—13 thereof;

FIG. 18 is a view of structure similarly illustrated in FIG. 4 showing a further modified form of the present invention.

Throughout the various modifications of the present invention identical parts are identified by the same reference numerals.

DESCRIPTION OF THE PREFERRED EMBODIMENTS

Figure 1:
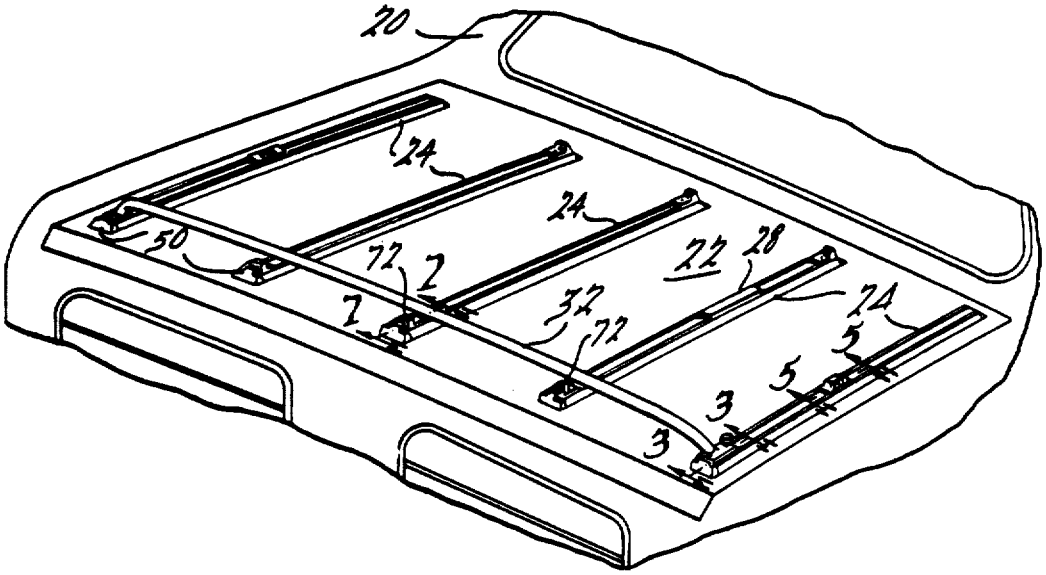
FIG. 1 is a fragmentary perspective view of an automobile showing an article carrier mounted thereon which is constructed in accordance with the principles of the present ivention.
Figure 2:
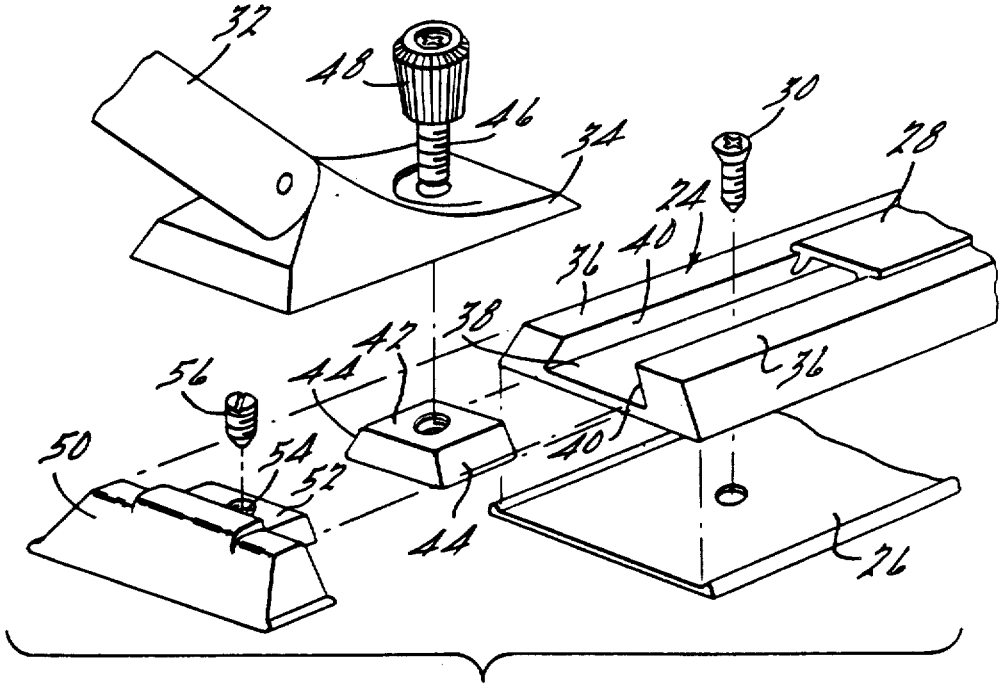
FIG. 2 is an enlarged exploded perspective view of a portion of the structure illustrated in FIG. 1.

FIG. 1 depicts an automobile 20 having a trunk lid 22 on which are mounted a plurality of identical, parallel, transversely spaced slats 24. Although the slats 24 are shown mounted on the trunk lid 22, the article carrier of the present invention may be mounted with equal utility on an automobile roof or any other generally horizontal exterior body portion of an automobile. Interposed between the slats 24 and the trunk lid 22 are elastomeric mounting pads 26 on which flat bottom surfaces 27 of the slats rest. The slats 24 are secured on the trunk lid 22 by means of sheet metal screws 30 which also pass through the mounting pads 26. Mounted on a pair of the slats 24 is a raised tubular cross bar 32 which is fitted at its opposite ends onto brackets 34. A cylindrical boss 58 on each bracket 34 is held in an end of the bar 32 by a screw 60. Each bracket 34 rests on a broad upwardly facing supporting surface 36 on the top of one of the slats 24. The surface 36 is interrupted by an upwardly open dove-tail shaped groove 38 extending the length of each slat 24. Extruded plastic trim members 28 are frictionally fitted in the channels 38 of the slats 24, one trim member 28 being broken away in FIG. 1 for illustrative purposes. It will be seen that the groove or channel 38 is wider at its bottom than at its top to define upwardly and inwardly inclined clamping surfaces 40. Conformably but slidably fitted within the channel 38 of various slats 24 are one or more nuts 42 of dove-tailed cross sectional shape. The nuts 42 have upwardly and inwardly inclined surfaces 44 which conformably engage the clamping surfaces 40 of the slats 24. A screw 46 is illustrated in FIG. 2 as passing through the bracket 34 from the top thereof into threaded engagement with a nut 42. The screw 46 is formed with an enlarged head 48 which may be manually gripped for the tightening and loosening of the screw 46. When the screw 46 is tightened, its associated nut 42 is drawn upwardly into clamping engagement with the channel clamping surfaces 40. This action also draws the bracket 34 down against the supporting surfaces 36, locking the bracket 34 firmly in place on its slat 24.

One or both ends of each of the slats 24 is fitted with a decorative end cap 50 having a dove-tail shaped tongue 52 fitted into the end of the channel 38. Each tongue 52 has a tapped hole 54 for the reception of a setscrew 56. When the setscrew 56 is tightened, its pointed end bears against the bottom of the channel 38 to lock the end cap 50 to its slat 24.

Figure 3:
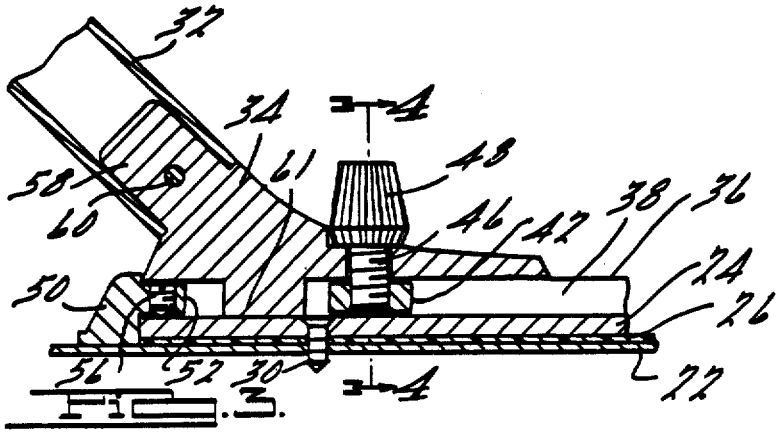
FIG. 3 is an enlarged sectional view of the structure illustrated in FIG. 1 taken along the line 3—3 thereof.
Figure 4:
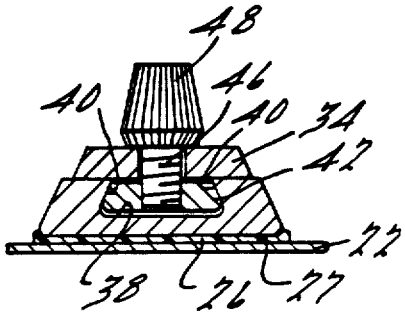
FIG. 4 is a sectional view of the structure illustrated in FIG. 3 taken along the line 4—4 thereof.

Possible rotation of the brackets 34 relative to the slats 24 is prevented by the formation of a dove-tail shaped boss 61 on the bottom of each bracket 34. Each boss 61 is conformably fitted within the channel 38 of its slat 24 as shown in FIG. 3. The nut 42 and boss 61 being longitudinally spaced, the bracket 34 is thereby kept from rotating about a vertical axis.

Figure 5:
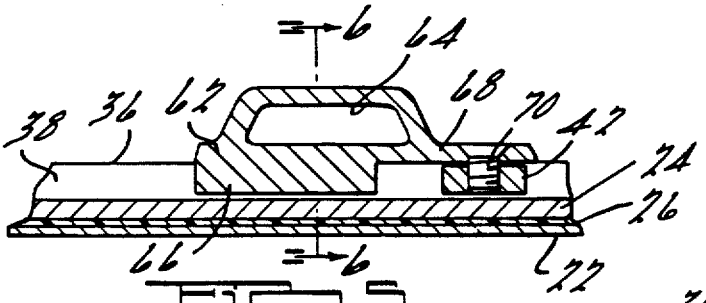
FIG. 5 is a sectional view of the structure illustrated in FIG. 1 taken along the line 5—5 thereof.
Figure 6:
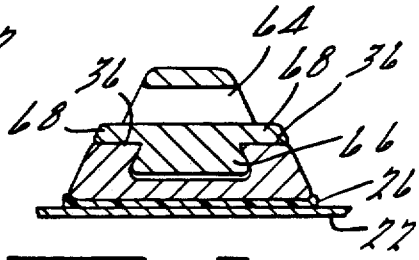
FIG. 6 is a sectional view of the structure illustrated in FIG. 5 taken along the line 6—6 thereof.

FIGS. 5 and 6 illustrate still another form of article securing member which is shown in FIG. 1 mounted on the outer slats 24. This article supporting member is in the form of a tie-down member 62 having an eyelet 64 for the reception of a rope, strap or other device intended to tie-down luggage on the slats 24. The tie-down member 62 has a dove-tail tongue 66 which is conformably fitted in the channel 38 of its slat 24. The tie-down member 62 is further provided with a peripheral ledge 68 surrounding the tongue 66 and resting on the slat supporting surface 36. A screw 70 passes through the tie-down member 62 into threaded engagement with a nut 42 by means of which the tie-down member may be clamped in any desired position along the length of its slat 24.

Figure 7:
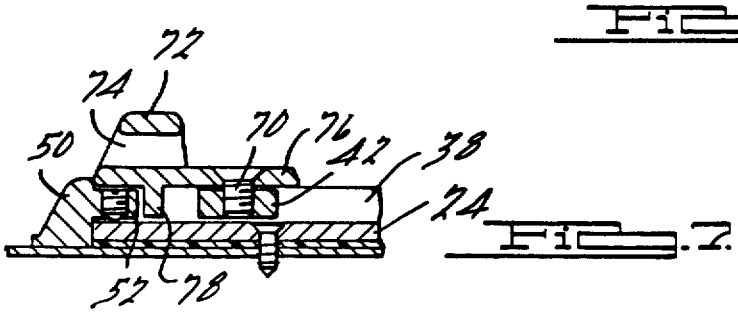
FIG. 7 is an enlarged sectional view of the structure illustrated in FIG. 1 taken along the line 7—7 thereof.

Another tie-down member 72 is illustrated in detail in FIG. 7 as being located at one or more ends of selected slats 24. Each tie-down member 72 has an eyelet 74 adapted to receive rope, a strap or the like. A shoulder portion 76 of the tie-down member 72 rests on the slat supporting surface 36 while a depending tongue 78 of the tie-down member 72 is conformably fitted in the channel 38. The tie-down member 72 is clamped into position by a screw 70 and nut 42. From FIG. 7 it will be seen that the tie-down member 72 overlies the tongue 52 of one of the end caps 50 thereby cooperating with the end cap 50 to hide its retaining means.

Figure 8:
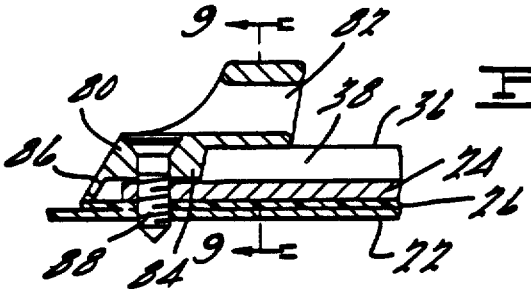
FIG. 8 is a view of structure similarly illustrated in FIG. 7 showing a modified form of the invention.
Figure 9:
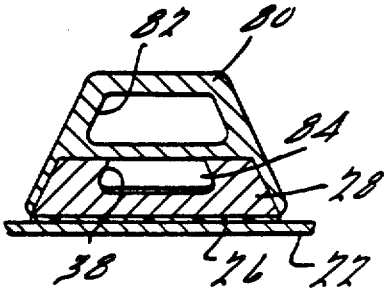
FIG. 9 is a sectional view of the structure illustrated in FIG. 8 taken along the line 9—9 thereof.

FIG. 8 illustrates a modification of the present invention in which a member 80 serves the combined functions of an end cap and tie-down. The member 80 will be seen to have an upstanding eyelet 82 and a tongue 84 which is fitted within the channel 38 of a slat 24. An end wall 86 of the member 80 covers the end of the slat 24. A screw 88 has its head exposed to the upper surface of the member 80 and passes through the slat 24, through the subjacent mounting pad 26 and into the trunk lid 22. Thus the screw 88 serves the combined function of securing both the member 80 and a slat 24 on the automobile.

Figure 10:
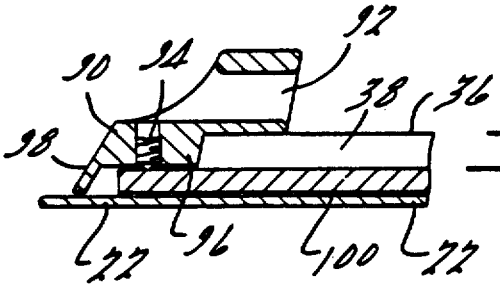
FIG. 10 is a view of structure similarly illustrated in FIG. 7 showing still another form of the present invention.

FIG. 10 illustrates still another form of the present invention in which an end member 90 has a raised eyelet 92 and is held in place on a slat 24 by means of a setscrew 94 bearing against the bottom of the channel 38. The screw 94 is threaded into an opening in a dove-tail shaped tongue 96 of the member 90 closely fitted in the channel 38. An end wall 98 of the member 90 covers the slat 24 at the one end thereof providing a smooth decorative end finish to the slat 24. The slat 24 illustrated in FIG. 10 is secured on the trunk lid 22 by means of an adhesive strip 100. The strip 100 is provided with adhesive on both sides thereof and takes the place of screws for holding the slat in place on the trunk lid 22.

Figure 11:
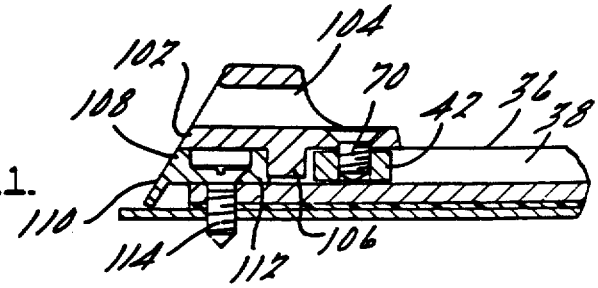
FIG. 11 is a sectional view of structure similarly illustrated in FIG. 7 showing a still further form of the present invention.

FIG. 11 illustrates the use of a tie-down member 102 having an eyelet 104. A dove-tail shaped tongue 106 of the member 102 is fitted in the channel 38 of the slat 24. The tie-down member 102 is secured in place on the slat 24 by means of a screw 70 and nut 42. The tie-down member 102 is used in cooperation with an end cap member 108 which underlies the rear portion of the tie-down member 102 and has a slat covering end wall 110. The end cap 108 has a dove-tail tongue 112 fitted in the channel 38 and held in place by a sheet metal screw which passes through the slat 24 at the bottom of the channel 38 and into the trunk lid 22.

It will be readily apparent that the cross bar 32 and its mounting brackets 34 are easily removed from the slats 24 by the simple unthreading of the screws 46. This can be done for the purpose of installing another type of article securing device on the slats 24 and the nuts 42 will remain in the slats 24 for that purpose. FIG. 12 illustrates the slats 24 on the trunk on the trunk lid 22 but with the cross bar 32 removed and a pair of ski rack clamps 116 installed on the outermost slats 24. The clamps 116 are of identical construction and include a lower supporting bar 118 to which is pivoted an upper clamping bar 120. The lower bar is fitted to a slat 24 through a pair of adapters 122 resting on the slat supporting surface 36. A cushion 124 is frictionally held on the top of the lower bar 118 through a spring clip 130 while a pair of screws 128 pass through the lower bar 118 and adapters 122 into threaded engagement with a pair of nuts 42. The heads of the screws 128 are normally covered by the cushion 124. The upper clamping bar 120 carries a rubber bumper 126 which is adapted to clamp the skis to be carried against the cushion 124. The bumper 126 is secured to the upper clamping bar 120 by means of screws 134 which also hold pole retaining clips 132 on the top of the upper clamping bar.

It will be seen that a single ski rack clamp 116 is mounted on a single slat 24. It will therefore be apparent that any article securing member to be utilized in conjunction with an article carrier of the present invention may be positioned entirely on a single slat 24 or on two or even more of the slats 24.

The removal of the ski rack clamps 116 is accomplished by simply pulling the cushion 124 out of each lower bar 118 and unthreading the screws 128. The ski carriers are, thus, easily detached from the vehicle and stored when not being used. In order to prevent the skis and/or ski carrier clamps 116 from being stolen when in use, the clamps may be provided with locks in the well known manner. Such locks keep the upper clamping bar 120 from being opened relative to the lower bar 118. So long as this is prevented, access to the heads of the screws 128 is precluded, thereby preventing the removal of the ski carriers 116 from the vehicle.

Figure 14:
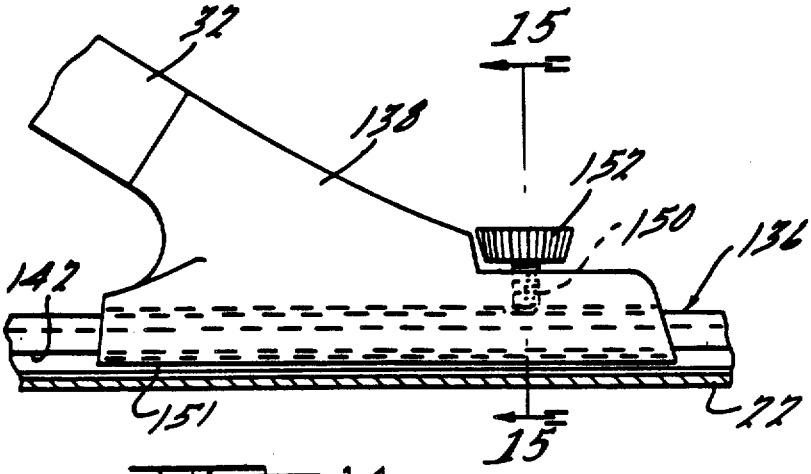
FIG. 14 is a fragmentary sectional view of a modified form of the present invention illustrating an alternative slat construction and an alternative method of attaching an article securing member on the slats.
Figure 15:
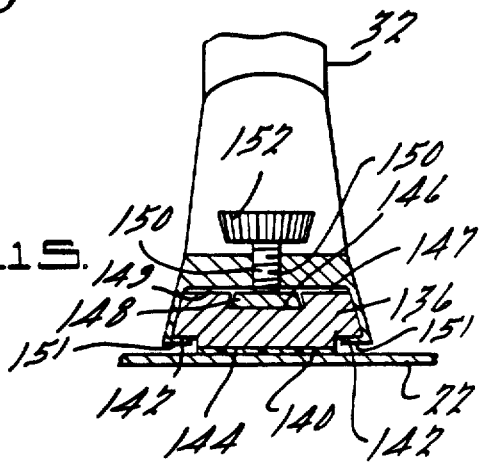
FIG. 15 is a sectional view of the structure illustrated in FIG. 14 taken along the line 15—15 thereof.

FIGS. 14 and 15 illustrate a somewhat modified form of slat 136 which will be seen to be used in connection with a bracket 138 for supporting a cross bar 32. The slat 136 is positioned on a rubber mounting pad 140 and is provided with downwardly facing clamping surfaces or shoulders 142 running along the opposite sides thereof. The shoulders 142 are raised with respect to a flat bottom surface 144 of the slat 136. An upwardly facing groove 146 is formed in a broad load supporting surface 147 on the top of the slat 136. A hardened seat 148 is positioned within the groove 146 for cooperation with a screw 150 threaded through the bracket 138. The screw 150 has an enlarged head 152 which may be gripped to rotate the screw into clamping engagement with the seat 148. The bracket 138 has a channel 149 on its lower surface and receives a slat 136. A pair of inturned lips formed on the opposite sides of the channel are drawn up against the clamping shoulders 142 to secure the bracket 138 in place on the slat 136 when the screw 150 is tightened. It will thus be apparent that the clamping surfaces of a slat of the present invention need not be necessarily located within a channel formed in the slat but may be located exteriorly of the slat.

Figure 16:
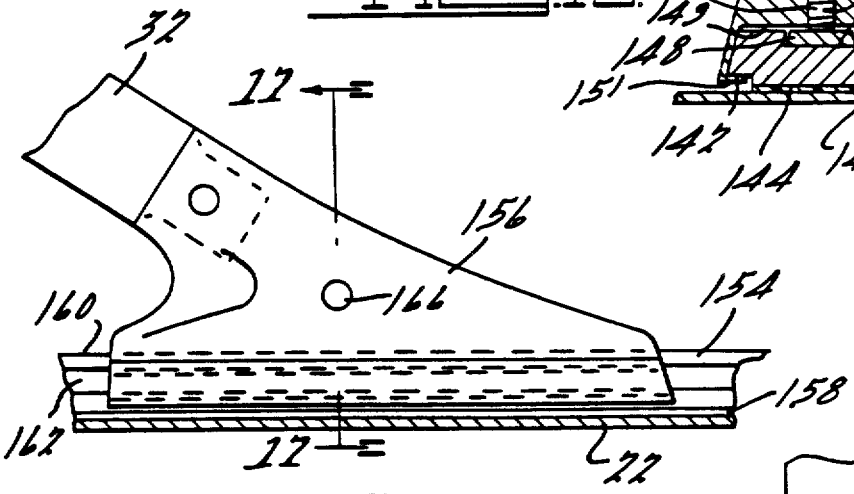
FIG. 16 is a view of structure similarly illustrated in FIG. 14 showing another modified slat construction and still further arrangement for securing the cross bar to the slats.
Figure 17:
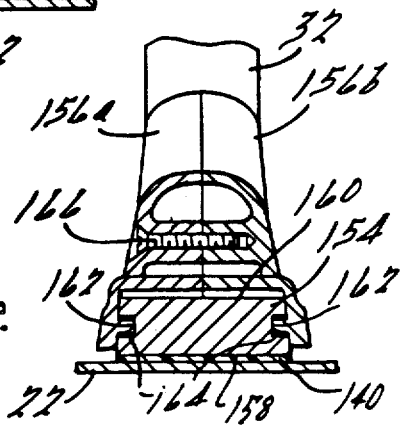
FIG. 17 is a sectional view of the structure illustrated in FIG. 16 taken along the line 17—17 thereof.

Another form of the present invention is illustrated in FIGS. 16 and 17 which makes use of exterior slat clamping surfaces FIGS. 16 and 17 show a slat 154 used in cooperation with a bracket 156. The slat 154 has a flat bottom 158 resting on a mounting pad 140. The slat 154 is also formed with a load supporting top surface 160, although the bracket 156 does not rest on the supporting surface 160. As seen in FIG. 17 the bracket 156 is formed in two parts: 156a and 156b. These two parts define inwardly projecting rails 164 which are received in external grooves 162 running longitudinally along the opposite sides of the slat 154. When the two halves 156a and 156b are drawn together by means of a screw 166, the rails 164 are caused to clampingly engage in the grooves 162 and secure the bracket 156 in a selected position.

The slats illustrated in the foregoing embodiments of the invention are desirably manufactured as aluminum extrusions and are of substantially uniform cross sectional shape. The slats of the present invention are not necessarily made as extrusions, however. Another form of slat 170 is illustrated in FIG. 18 which is made from a roll formed steel. The slat 170 will be seen to have a flat bottom wall 172, upwardly inclined sidewalls 174 defining interior clamping surfaces and upper supporting surfaces 176. The slat 170 defines an upwardly open channel 178 within which a nut 180 is positioned. FIG. 18 illustrates the use of the slat 170 in conjunction with the bracket 34. The slat 170 is used and functions in a manner similar to the slat 24.

It will be apparent that it is not necessary to keep the cross bar 32 and its supporting bracket 34 or the ski rack clamps 116 on the slats. Any such raised article securing members may be left off the vehicle unless desired for a particular purpose. The removal of such members may be desired to prevent interference with the functioning of an automatic car wash machine, for appearance reasons or any other purpose. The various tie-downs illustrated herein are of very low height and are quite inconspicuous. Leaving them on the carrier has little influence on either the appearance of the carrier or its use for any other purpose.

It will be apparent that the slats 24, 136, 154 and 170 illustrated herein may be utilized for the mounting of a wide variety of article securing members and their use is not limited to the particular article securing members illustrated herein. For example, a complete rectangular framework of four bars can be mounted on the slats instead of the single cross bar 32. Such a framework would use four brackets 34, with two brackets mounted on each of two slats. Specific article securing devices can be designed for various other objects a car owner might wish to carry (e.g., small boats, golf club bags, etc.). The installation and removal of all such devices is easily accomplished without drilling special holes or in any way detracting from the appearance of the car.

What is claimed is:

1. An article carrier for an automobile comprising a plurality of at least two parallel arranged slats disposed on a generally horizontally extending exterior body surface of the automobile and lying closely against said surface, *at least two of said slats being fixedly secured directly to said automobile on said surface independently of one another by separate primary fastening means which separately secures each slat directly to said automobile without contact with any other slat;* each of said *at least two* slats having major and minor transverse dimensions, with said major dimension being arranged substantially parallel to said body surface and said minor dimension being arranged substantially perpendicular to said body surface, each of said *at least two* slats having a generally horizontally arranged upper article supporting surface adapted to have articles supported directly thereupon, and a pair of end members disposed one at each end of at least one of said *at least two* slats, at least one of said end members comprising means for securing articles to said article carrier and including means for securing said slat and said end member to said exterior body surface.

2. An article carrier in accordance with claim 1, wherein said article securing means comprises an eyelet within said end member.

3. An article carrier for an automobile comprising at least two parallel arranged slats [disposed on] *fixedly secured independently of one another to* a generally horizontally extending exterior body surface of the automobile [and] *by separate primary fastening elements which project from above the surface of the automobile downwardly through openings in said surface of the automobile to a position subjacent said surface of the automobile, said at least two parallel arranged slats* lying closely against said surface *in a low profile configuration,* each of said slats having major and minor transverse dimensions, with said major dimension being arranged substantially parallel to said body surface and said minor dimension being arranged substantially perpendicular to said body surface, each of said slats having a generally horizontally arranged upper article supporting surface adapted to have articles supported directly thereupon, and at least one end member disposed at one end of at least one of said slats, including means for securing an article to said carrier;

means for securing said end member and at least in part said slat to said body surface, and means for abutting articles disposed on said upper article supporting surface of said slat.

4. An article carrier in accordance with claim 3, wherein said article securing means comprises an eyelet disposed integrally in said end member.

5. The invention as set forth in claim 4 wherein said exterior body surfaces of the automobile comprises the upper surface of the automobile trunk.

6. The invention as set forth in claim 3 which includes at least one intermediate slat disposed between and extending parallel to said first-mentioned two parallel arranged slats, including end cap means fixedly secured to at least one end of said intermediate slat and cooperable therewith for securing articles upon said article carrier.

7. The invention as set forth in claim 6 wherein the height of the upper surface of said end cap means is disposed approximately the same distance above said exterior body surface as said supporting surfaces of the associated pair of said slats.

8. The invention as set forth in claim 6 which further comprises a plurality of three intermediate slats disposed between and arranged generally parallel to said first mentioned slats.

9. The invention as set forth in claim 8 wherein each said end member is secured to the forward longitudinal ends of each of said slats.

10. The invention as set forth in claim 3 wherein each said end member associated with each of said slats is disposed at the same longitudinal ends of said slats.

11. The invention as set forth in claim 10 further comprising at least one intermediate slat provided with an end member at both the forward and rearward ends thereof.

12. The invention as set forth in claim 3 wherein said abutting means comprises an elevated restraining bar extending generally transversely of the automobile adjacent the rearward ends of said slats.

13. The invention as set forth in claim 12 which includes brackets for supporting said restraining bar, said brackets comprising first portions having an outer exterior surface that blends generally into the shape of the outer ends of said slats and second portions directed upwardly from said first portions toward the horizontal plane of said elevated restraining bar.

14. The invention as set forth in claim 13 wherein said second portions of said brackets comprise an outer peripheral portion which blends generally into the cross sectional shape of said restraining bar.

15. The invention as set forth in claim 13 wherein the cross sectional shape of said second portion of each of said brackets is of the same general cross sectional shape as the adjacent end of said restraining bar.

16. The invention as set forth in claim 13 wherein said second portion of each of said brackets is telescopically engageable with the adjacent end of said restraining bar.

17. The invention as set forth in claim 1 which includes at least one intermediate slat disposed between and extending parallel to said first-mentioned two parallel arranged slats, and which further includes end members fixedly secured to at least one end of each of said slats and cooperable therewith for securing articles upon said article carrier.

18. The invention as set forth in claim 17 wherein said end members associated with each of said slats are disposed at the same longitudinal ends of said slats.

19. The invention as set forth in claim 18 wherein said end members are secured to the forward longitudinal ends of each of said slats.

20. The invention as set forth in claim 19 wherein at least one of said intermediate slats is provided with end members at both the forward and rearward ends thereof.

21. The invention as set forth in claim 17 wherein the height of the upper surface of said end members is disposed approximately the same distance above said exterior body surface as said supporting surfaces of the associated pair of said slats.

22. The invention as set forth in claim 1 wherein said exterior body surfaces of the automobile comprises the upper surface of the automobile trunk.

23. The invention as set forth in claim 1 which further comprises a plurality of three intermediate slats disposed between and arranged generally parallel to said first mentioned slats.

24. The invention as set forth in claim 1 which further comprises an elevated restraining bar extending generally transversely of the automobile adjacent the rearward ends of said slats.

25. The invention as set forth in claim 24 which includes mounting brackets for said restraining bar, said brackets comprising first portions having an outer exterior surface that blends generally into the shape of the outer ends of said slats and second portions directed upwardly from said first portions toward the horizontal plane of said elevated restraining bar.

26. The invention as set forth in claim 25 wherein said second portions of said brackets comprise an outer peripheral portion which blends generally into the cross sectional shape of said restraining bar.

27. The invention as set forth in claim 25 wherein the cross sectional shape of said second portion of each of said brackets is of the same general cross sectional shape as the adjacent end of said restraining bar.

28. The invention as set forth in claim 25 wherein said second portion of each of said brackets is telescopically engageable with the adjacent end of said restraining bar.

*29. An article carrier for an automobile comprising*

*a plurality of at least two parallel arranged slats disposed on a generally horizontally extending exterior body surface of the automobile fixedly secured independently of one another to said automobile on said surface by separate primary fastening means for each slat which fastening means does not extend laterally outwardly beyond the laterally outer sides of the two laterally outermost slats of said article carrier extending perpendicular to and through said surface, said at least two slats lying closely against said surface;*

*each of said slats having a generally horizontally arranged upper article supporting surface means adapted to have articles supported directly thereupon, comprising at least one upper article supporting surface disposed in operable association with each said slat; and*

*a pair of end members disposed one at each end of at least one of said slats;*

*at least one of said end members comprising means for securing articles to said article carrier and including means for securing said slat and said end member to said exterior body surface.*

*30. An article carrier for an automobile comprising*

*a plurality of at least two parallel arranged slats disposed on a generally horizontally extending exterior body surface of the automobile fixedly secured to said automobile on said surface independently of one another by separate fastening means for each slat which fastening means extends at least to the surface of said automobile and permits totally uninterrupted view of said automobile surface between any two adjacent slats and at the laterally outer sides of the article carrier, said at least two slats lying closely against said surface;*

*each of said slats having a generally horizontally arranged upper article supporting surface means adapted to have articles supported directly thereupon;*

*a pair of end members disposed one at each end of at least one of said slats; and*

*at least one of said end members comprising means for securing articles to said article carrier and including means for securing said slat and said end member to said exterior body surface.*

*31. An article carrier for an automobile comprising*

*at least two parallel arranged slats disposed on a generally horizontally extending exterior body surface of the automobile with each slat being fixedly secured directly to said body surface independently of one another by separate primary fastening means solely associated with each separate slat, said at least two slats lying closely against said surface in a low profile configuration, each of said slats having a generally horizontally arranged upper article supporting surface means adapted to have articles supported directly thereupon, and*

*at least one end member disposed at one end of at least one of said slats, including*

*means for securing an article to said carrier;*

*means for securing said end member and at least in part said slat to said body surface, and*

*means for abutting articles disposed on said upper article supporting surface of said slat.*

* * * * *